United States Patent
Lee et al.

(10) Patent No.: US 9,910,547 B2
(45) Date of Patent: Mar. 6, 2018

(54) ANTI-INTERFERENCE TOUCH SENSING STRUCTURE

(71) Applicants: HannStar Display (Nanjing) Corporation, Nanjing (CN); HANNSTAR DISPLAY CORPORATION, Taipei (TW)

(72) Inventors: Hsing-Ying Lee, Taipei (TW); Da-Ching Tang, Taipei (TW)

(73) Assignees: HANNSTAR DISPLAY (NANJING) CORPORATION, Nanjing (CN); HANNSTAR DISPLAY CORPORATION, Taipei (TW)

( * ) Notice: Subject to any disclaimer, the term of this patent is extended or adjusted under 35 U.S.C. 154(b) by 125 days.

(21) Appl. No.: 14/712,543

(22) Filed: May 14, 2015

(65) Prior Publication Data
US 2016/0034074 A1  Feb. 4, 2016

(30) Foreign Application Priority Data
Jul. 29, 2014 (CN) .......................... 2014 1 0367553

(51) Int. Cl.
*G06F 3/044* (2006.01)
*G09G 5/00* (2006.01)
*G06F 3/041* (2006.01)

(52) U.S. Cl.
CPC .............. *G06F 3/044* (2013.01); *G06F 3/041* (2013.01); *G09G 5/003* (2013.01); *G09G 2300/0426* (2013.01)

(58) Field of Classification Search
CPC ........ G06F 3/044; G06F 3/0418; G06F 3/041; C03C 17/3417; G09G 5/003; G09G 2300/0426
See application file for complete search history.

(56) References Cited

U.S. PATENT DOCUMENTS

| | | | | |
|---|---|---|---|---|
| 2002/0086188 A1* | 7/2002 | Halsey, IV | .......... | C03C 17/3417 428/697 |
| 2012/0075218 A1* | 3/2012 | Lin | ........................ | G06F 3/0418 345/173 |
| 2014/0204048 A1* | 7/2014 | Lai | .......................... | G06F 3/044 345/174 |
| 2015/0160759 A1* | 6/2015 | Lien | ........................ | G06F 3/0418 345/174 |

FOREIGN PATENT DOCUMENTS

| | | |
|---|---|---|
| CN | 101488066 A | 7/2009 |
| CN | 101989106 A | 3/2011 |
| CN | 102445805 A | 5/2012 |
| CN | 103135821 A | 6/2013 |
| CN | 103246409 A | 8/2013 |
| CN | 103702518 A | 4/2014 |
| CN | 103941900 | 7/2014 |

* cited by examiner

*Primary Examiner* — Richard Hong
(74) *Attorney, Agent, or Firm* — Muncy, Geissler, Olds & Lowe, P.C.

(57) ABSTRACT

An anti-interference touch sensing structure includes a first substrate, a plurality of touch sensing units and at least a first anti-interference spot. The touch sensing units are coplanarly disposed on the first substrate, and a first interval region is formed between the adjacent touch sensing units. The first anti-interference spot is disposed within the first interval region.

18 Claims, 7 Drawing Sheets

ANTI-INTERFERENCE TOUCH SENSING STRUCTURE

CROSS REFERENCE TO RELATED APPLICATIONS

This Non-provisional application claims priority under 35 U.S.C. §119(a) on Patent Application No(s). 201410367553.0 filed in People's Republic of China on Jul. 29, 2014, the entire contents of which are hereby incorporated by reference.

BACKGROUND OF THE INVENTION

Field of Invention

The invention relates to a touch sensing structure and, in particular, to an anti-interference touch sensing structure.

Related Art

Recently, the touch technology has been widely applied to common consumer electronic products such as mobile phones, digital cameras, MP3, PDA, GPS, hand-held PC and UMPC (ultra mobile PC). The touch technology can be applied to the display panel in multiple manners. For example, a touch panel is attached to the display panel, i.e. the out-cell type, or the touch sensing units are directly formed on the display panel, which is the embedded type and can be divided into on-cell type and in-cell type. However, the conventional touch sensing structure suffered the problem of a decreasing product yield.

A conventional touch sensing structure includes a substrate and a plurality of touch sensing units. The touch sensing units are disposed on the substrate and used to generate electric signals by sensing the touch of users, and therefore the touch coordinates of the user can be obtained after the electric signal process. However, since there is the interval just of 10 µm~30 µm between the touch sensing units, the adjacent touch sensing units will be easily short-circuited when particles fall down or scratches happen during the process. As a result, the malfunction of the touch product may happen and the product yield will be decreased.

Therefore, it is important to provide an anti-interference touch sensing structure whereby the above-mentioned short circuit problems can be solved and the touch function and product yield can be enhanced.

SUMMARY OF THE INVENTION

In view of the foregoing, the invention relates, in one embodiment, to provide an anti-interference touch sensing structure whereby the above-mentioned short circuit problem can be solved and the touch function and product yield can be enhanced.

An anti-interference touch sensing structure of this invention includes a first substrate, a plurality of touch sensing units and at least a first anti-interference spot. The touch sensing units are coplanarly disposed on the first substrate, and a first interval region is formed between the adjacent touch sensing units. The first anti-interference spot is disposed within the first interval region.

In one embodiment, the first anti-interference spot is electrically floating.

In one embodiment, the first anti-interference spot covers at least a part of the touch sensing units and is filled into the first interval region.

In one embodiment, the touch sensing units include a plurality of first touch sensing elements electrically connected with each other along a first direction and a plurality of second touch sensing elements electrically connected with each other along a second direction.

In one embodiment, the width of the first anti-interference spot is between 50 µm and 70 µm, and a distance exists between the first anti-interference spot and the adjacent touch sensing unit.

In one embodiment, the width of the first interval region is between 70 µm and 130 µm.

In one embodiment, the anti-interference touch sensing structure further comprises a grounding unit and at least a second anti-interference spot. The grounding unit is disposed coplanarly with the touch sensing units. The grounding unit and the adjacent touch sensing unit have a second interval region therebetween. The second anti-interference spot is disposed within the second interval region.

In one embodiment, by the first anti-interference spot disposed within the first interval region formed by the adjacent touch sensing units, the interval between the adjacent touch sensing units is increased, the short circuit is prevented even if the particle pollution is caused during a subsequent process, so as to provide the electrical anti-interference effect.

In one embodiment, the subsequent process at least includes a mechanical thinning process, a chemical thinning process, a chemical-mechanical thinning process, a photolithography process, a thin film deposition process and/or a thin film etching process.

In one embodiment, the first anti-interference spot is a massive spot or includes at least a bent spot.

As mentioned above, in the anti-interference touch sensing structure of this invention, the first anti-interference spot is disposed in the first interval region formed by the adjacent touch sensing units, and thereby the interval between the touch sensing units is increased, for example, to 70 µm~130 µm from the original 10 µm~30 µm. Hence, even if the particles fall down or the scratch occurs during the process, the adjacent touch sensing units won't be short-circuited. Therefore, the first anti-interference spots provide the electrical anti-interference effect, so as to prevent the malfunction of the touch product and enhance the product yield. Furthermore, the touch sensing units may make the human eyes perceive the existence of the touch sensing units, but because the first anti-interference spot is disposed between the adjacent touch sensing units, the human eyes will not easily perceive their existence, so that the first anti-interference spot can further provide the optical anti-interference effect and the display performance can be maintained.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
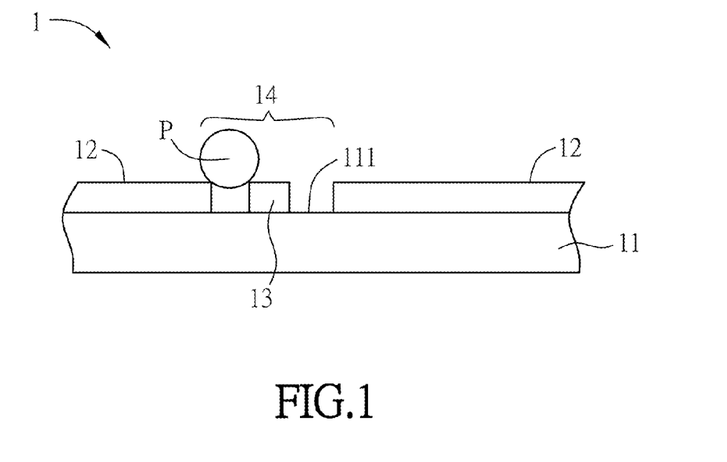
FIG. 1 is a schematic sectional diagram of an anti-interference touch sensing structure of an embodiment of the invention.

FIG. 1 is a schematic sectional diagram of an anti-interference touch sensing structure 1 of an embodiment of the invention. As shown in FIG. 1, the anti-interference touch sensing structure 1 includes a first substrate 11, a plurality of touch sensing units 12 and at least a first anti-interference spot 13.

The first substrate 11 can be a glass substrate, a plastic substrate, a ceramic substrate, a sapphire substrate or another type of substrate, and herein the glass substrate is illustrated as an example. The first substrate 11 can be a rigid substrate or a flexible substrate, and the first substrate 11 can be applied to the flexible display when being a flexible substrate. In application, the first substrate 11 can be a cover glass to reduce the thickness of the applied touch display panel.

The touch sensing units 12 are coplanarly disposed on the first substrate 11. A first interval region 14 is formed between the adjacent touch sensing units 12. The touch sensing units 12 can be made by transparent conducting materials, such as indium tin oxide (ITO) or other metal oxides. The touch sensing units 12 are disposed on a surface 111 of the first substrate 11 to make the coplanar disposition. The adjacent touch sensing units 12 shown in FIG. 1 are electrically insulated from each other for example.

The first anti-interference spot 13 is disposed within the first interval region 14. In practice, for reducing the technical steps, the first anti-interference spot 13 and the touch sensing units 12 can be made in the same process and have the same material. However, this invention is not limited thereto. Herein, the first anti-interference spot 13 is made by the conducting materials and is electrically floating, and a distance exists between the first anti-interference spot 13 and the adjacent touch sensing unit 12. By disposing the first anti-interference spot 13 within the first interval region 14, the interval between the adjacent touch sensing units 12 (first interval region 14) can be increased. Therefore, even if the particles P fall down or the scratch occurs, the adjacent touch sensing units 12 won't be short-circuited, so as to prevent the malfunction of the touch product and enhance the product yield. The above-mentioned particles p come from, for example, the subsequent process which can at least include a mechanical thinning process, a chemical thinning process, a chemical-mechanical thinning process, a photo-lithography process, a thin film deposition process and/or a thin film etching process. By disposing the first anti-interference spot 13 within the first interval region 14 formed by the adjacent touch sensing units 12, the interval between the adjacent touch sensing units 12 can be enlarged. Thereby, the short circuit won't be caused even if the particle pollution of the subsequent process occurs, so as to provide the electrical anti-interference effect.

Besides, the touch sensing units 12 may make the human eyes perceive the existence of the touch sensing units 12, but because the first anti-interference spot 13 is disposed between the adjacent touch sensing units 12, the human eyes will not easily perceive the existence and therefore the display efficiency can be kept. For example, the width of the first anti-interference spot 13 is between 50 μm and 70 μm, and the width of the first interval region 14 is between 70 μm and 130 μm. In one embodiment, the material of the first anti-interference spot 13 can include metal oxide. Moreover, the first anti-interference spots 13 can include a massive spot or a bent spot.

Figure 2:
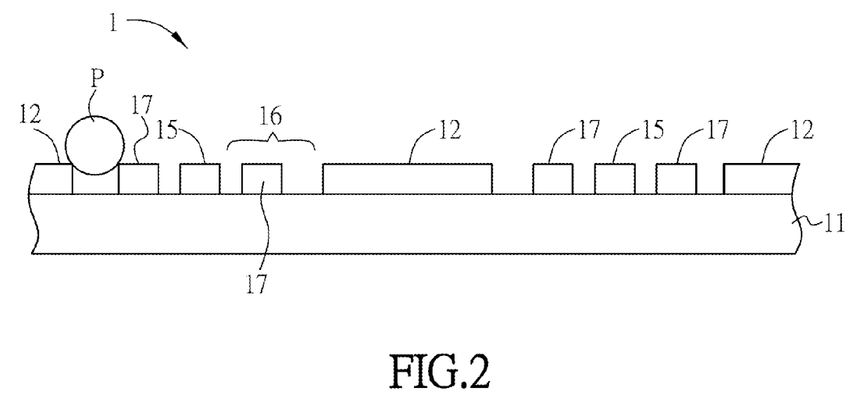
FIG. 2 is a schematic diagram of a variation of an anti-interference touch sensing structure of an embodiment of the invention.

FIG. 2 is a schematic diagram of a variation of the anti-interference touch sensing structure 1 of an embodiment of the invention. As shown in FIG. 2, the anti-interference touch sensing structure 1 further includes a grounding unit 15. The grounding unit 15 is disposed coplanarly with the touch sensing units 12, and the grounding unit 15 and the adjacent touch sensing unit 12 have a second interval region 16 therebetween. Besides, at least a second anti-interference spot 17 is disposed within the second interval region 16. Likewise, in practice, for reducing the technical steps, the second anti-interference spot 17 and the touch sensing units 12 can be made in the same process and have the same material. However, this invention is not limited thereto. Herein, the second anti-interference spot 17 is made by the conducting materials and is electrically floating. By disposing the second anti-interference spot 17 within the second interval region 16, the interval between the touch sensing unit 12 and the grounding unit 15 (second interval region 16) can be increased. Therefore, even if the particles P fall down or the scratch occurs, the touch sensing unit 12 and the adjacent grounding unit 15 won't be short-circuited, so as to prevent the malfunction of the touch product and enhance the product yield. Besides, the touch sensing unit 12 and the grounding unit 15 may make the human eyes perceive their existence, but because the second anti-interference spot 17 is disposed between the touch sensing unit 12 and the adjacent grounding unit 15, the human eyes will not easily perceive the existence so that the display efficiency can be kept. For example, the width of the second anti-interference spot 17 is between 50 μm and 70 μm, and the width of the second interval region 16 is between 70 μm and 130 μm.

In a top view, the shapes of the touch sensing unit 12, first anti-interference spot 13, grounding unit 15 and second anti-interference spot 17 are not limited, which can be, for example, a curved shape, a triangle, a quadrangle (such as a rhombus), another polygon or their any combination. Herein, some examples are illustrated in FIGS. 3A to 3C.

Figure 3A:
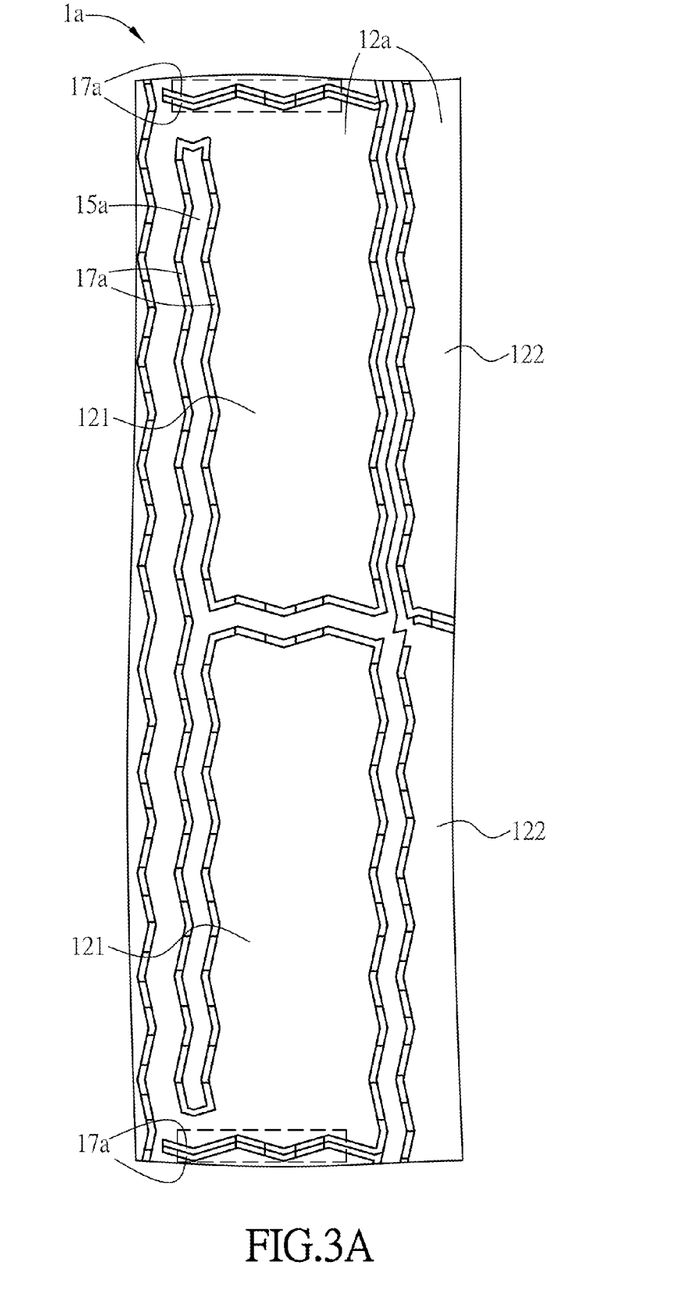
FIGS. 3A to 3C are schematic top views of the anti-interference touch sensing structure of different embodiments of the invention.
Figure 3B:
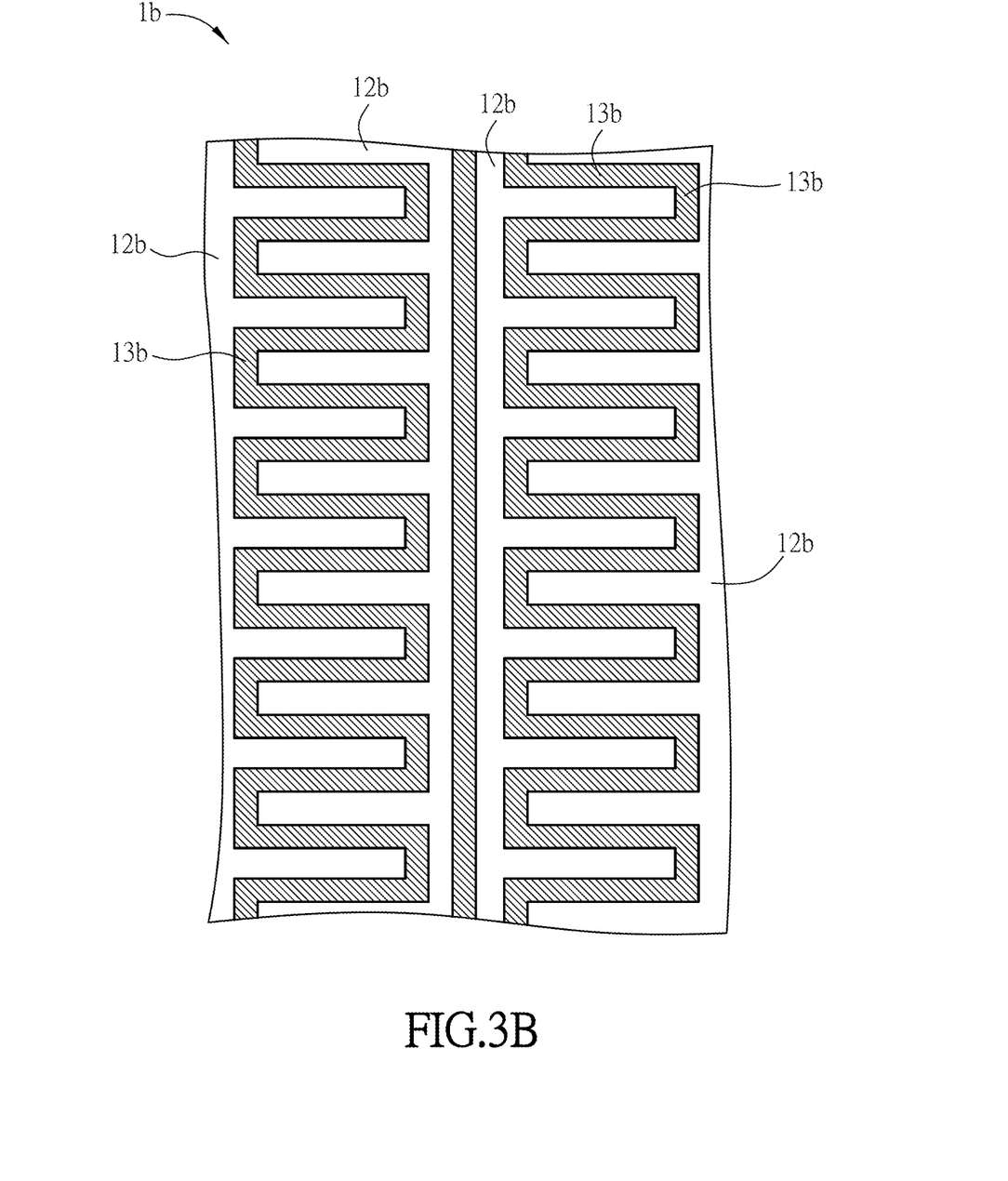
Figure 3C:
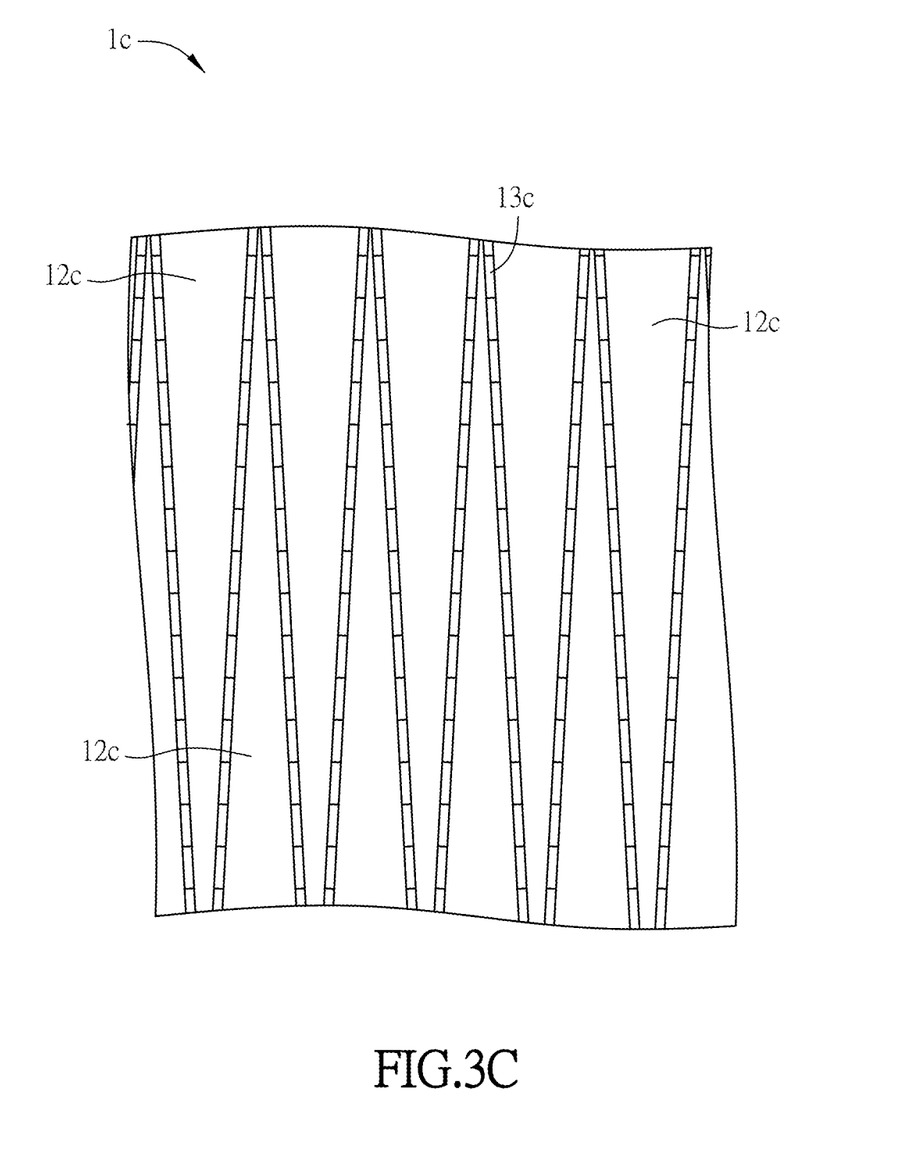

FIG. 3A is a schematic top view of the anti-interference touch sensing structure 1a of an embodiment of the invention. As shown in FIG. 3A, the touch sensing unit 12a of the anti-interference touch sensing structure 1a has a quadrangle-like shape. The grounding unit 15a is disposed around the touch sensing unit 12a and, for example, between the adjacent touch sensing units 12a. Moreover, the anti-interference spot (second anti-interference spot 17a for example) is disposed within the second interval region formed by the grounding unit 15a and the touch sensing unit 12a. Herein, the second anti-interference spot 17a is disposed on at least one side of the touch sensing unit 12a or around the whole touch sensing unit 12a.

Moreover, in this embodiment, the first anti-interference spots or the second anti-interference spots can be disposed adjacent to each other. For example, the dotted block in FIG. 3A shows two second anti-interference spots 17a disposed adjacent to each other. Therefore, the width of the two adjacent second anti-interference spots 17a can be between 100 μm and 140 μm, and the width of the second interval region 16 can be between 120 μm and 200 μm. The same disposition also can be applied to the first anti-interference spot, and the related description is omitted here for conciseness.

Furthermore, the touch sensing units 12a can include a plurality of first touch sensing elements 121 and a plurality of second touch sensing elements 122. The first touch sensing elements 121 serve as the transmitters and the second touch sensing elements 122 serve as the receivers. The transmitters are coupled with an excitation signal (not shown). When the user touches, the capacitance between the first touch sensing element 121 and the second touch sensing element 122 is changed so that the touch coordinates can be obtained.

In other embodiments, the touch sensing units 12 can include a plurality of first touch sensing elements electrically connected with each other along the first direction and a plurality of second touch sensing elements electrically connected with each other along the second direction. For example, the first direction is X direction and the second direction is Y direction. Thereby, the touch coordinates of the user can be obtained after the signal process. Since the conventional art can be applied thereto, the related description is omitted here for conciseness.

FIG. 3B is a schematic top view of the anti-interference touch sensing structure 1b of another embodiment of the invention. As shown in FIG. 3B, the touch sensing unit 12b of the anti-interference touch sensing structure 1b has a bent shape. Moreover, the anti-interference spot (first anti-interference spot 13b for example) is disposed within the first interval region formed by the adjacent touch sensing units 12b. Herein, the first anti-interference spot 13b exhibits a zigzag pattern and is disposed on at least one side of the touch sensing unit 12b or around the whole touch sensing unit 12b.

FIG. 3C is a schematic top view of the anti-interference touch sensing structure 1c of another embodiment of the invention. As shown in FIG. 3C, the touch sensing unit 12c of the anti-interference touch sensing structure 1c has a triangular shape and the touch sensing units 12c are disposed side by side. Moreover, the anti-interference spot (first anti-interference spot 13c for example) is disposed within the first interval region formed by the adjacent touch sensing units 12c. Herein, the first anti-interference spot 13c has a strip-like shape and is disposed on at least one side of the touch sensing unit 12c or around the whole touch sensing unit 12c.

Figure 4:
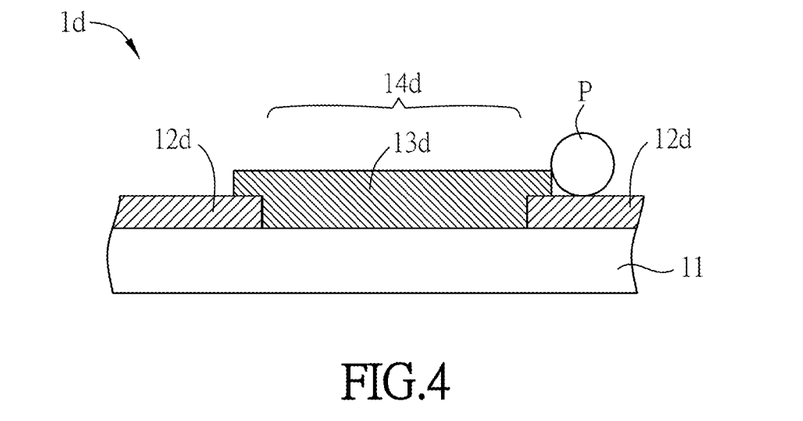
FIG. 4 is a schematic sectional diagram of an anti-interference touch sensing structure of another embodiment of the invention.

FIG. 4 is a schematic sectional diagram of an anti-interference touch sensing structure 1d of another embodiment of the invention. As shown in FIG. 4, the first anti-interference spot 13d of the anti-interference touch sensing structure 1d not only is disposed in the first interval region 14d but also covers at least a part of the touch sensing units 12d and is filled into the first interval region 14d. Herein, the first anti-interference spot 13d is made by the insulating material such that the touch sensing units 12d won't be short-circuited. The first anti-interference spot 13d can be made by the transparent material so as to be pervious to the light.

Figure 5:
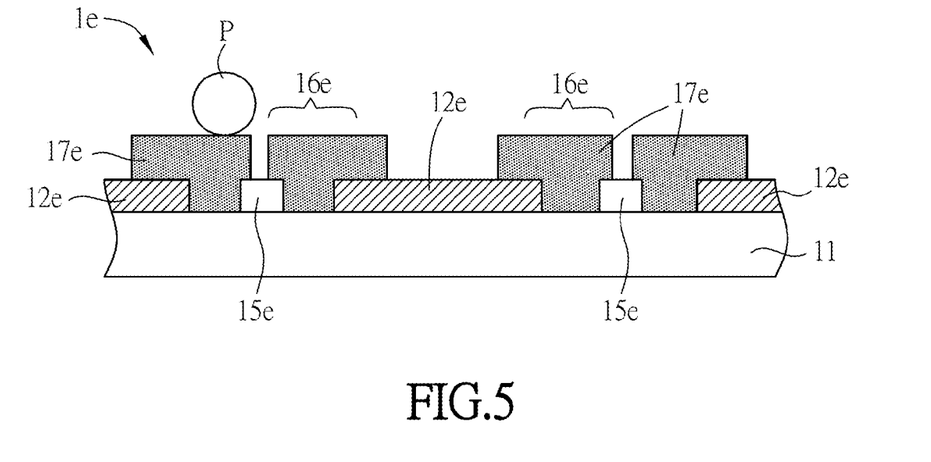
FIG. 5 is a schematic sectional diagram of an anti-interference touch sensing structure of another embodiment of the invention.

FIG. 5 is a schematic sectional diagram of an anti-interference touch sensing structure 1e of another embodiment of the invention. As shown in FIG. 5, the second anti-interference spot 17e of the anti-interference touch sensing structure 1e not only is disposed in the second interval region 16e but also covers at least a part of the touch sensing units 12e and is filled into the second interval region 16e. Herein, the second anti-interference spot 17e is made by the insulating material such that the touch sensing unit 12e and the grounding unit 15e won't be short-circuited. The second anti-interference spot 17e can be made by the transparent material so as to be pervious to the light.

Any of the above-mentioned anti-interference touch sensing structures can be applied to any kind of the touch panel, display panel or touch display panel, such as the touch technology using metal mesh, out-cell or embedded type touch display panel, organic electro-luminescence (OEL) touch panel or liquid crystal touch display panel, and some examples are illustrated as below.

Figure 6:
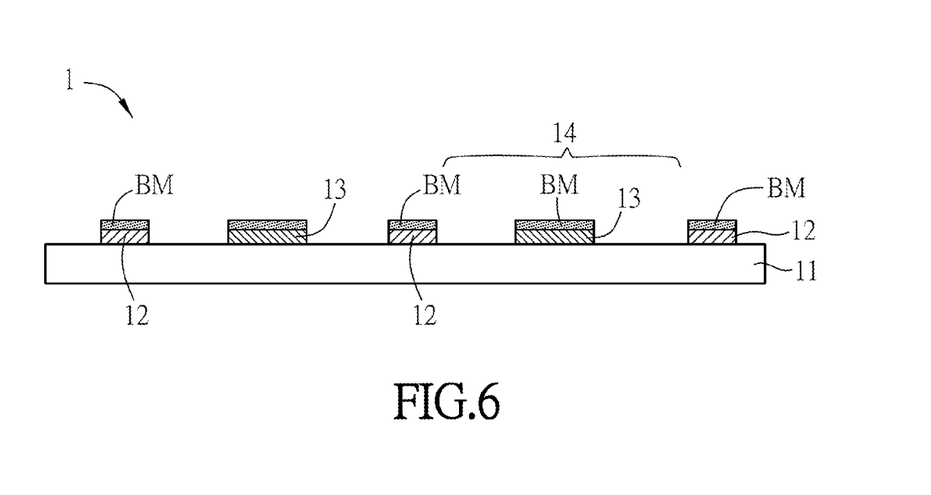
FIG. 6 is a schematic diagram of the anti-interference touch sensing structure applied to the metal mesh of an embodiment of the invention.

FIG. 6 is a schematic diagram of the anti-interference touch sensing structure applied to the metal mesh of an embodiment of the invention, and herein the anti-interference touch sensing structure 1 is illustrated as an example. As shown in FIG. 6, a plurality of touch sensing units 12 are coplanarly disposed on the first substrate 11 of the anti-interference touch sensing structure 1, and the first interval region 14 is formed between the adjacent touch sensing units 12. Herein, the touch sensing units 12 are the metal-made touch sensing wires so that they can reduce the signal attenuation problem occurring in the design of a large-size ITO by their own conducting property of the metal material. Besides, the metal material has well flexibility than ITO so that it can be applied to a flexible touch panel. The first anti-interference spot 13 is disposed within the first interval region 14. Moreover, the anti-interference touch sensing structure 1 further includes a black matrix unit BM, which is disposed as overlapping the touch sensing units 12 and, for example, is disposed over the touch sensing units 12. The black matrix unit BM can absorb the light passing through the region of the touch sensing units 12, so as to enhance the display performance. Besides, the black matrix unit BM also can be disposed as overlapping the first anti-interference spots 13 and, for example, is disposed over the first anti-interference spots 13.

Figure 7:
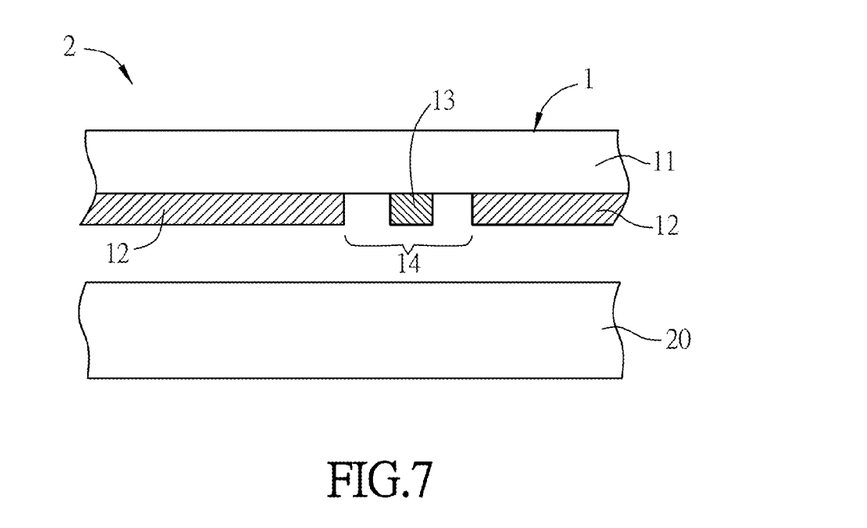
FIG. 7 is a schematic diagram of the anti-interference touch sensing structure applied to the out-cell touch display panel of an embodiment of the invention.

FIG. 7 is a schematic diagram of the anti-interference touch sensing structure applied to the out-cell touch display panel of an embodiment of the invention, and herein the anti-interference touch sensing structure 1 is illustrated as an example. As shown in FIG. 7, the touch display device 2 includes the anti-interference touch sensing structure 1 and a display device 20. The anti-interference touch sensing structure 1 is disposed adjacent to the display device 20 and they can be attached to each other. The display device 20 includes, for example, a liquid crystal display (LCD) panel, an organic light emitting diode (OLED) display panel or another kind of display panel.

Figure 8:
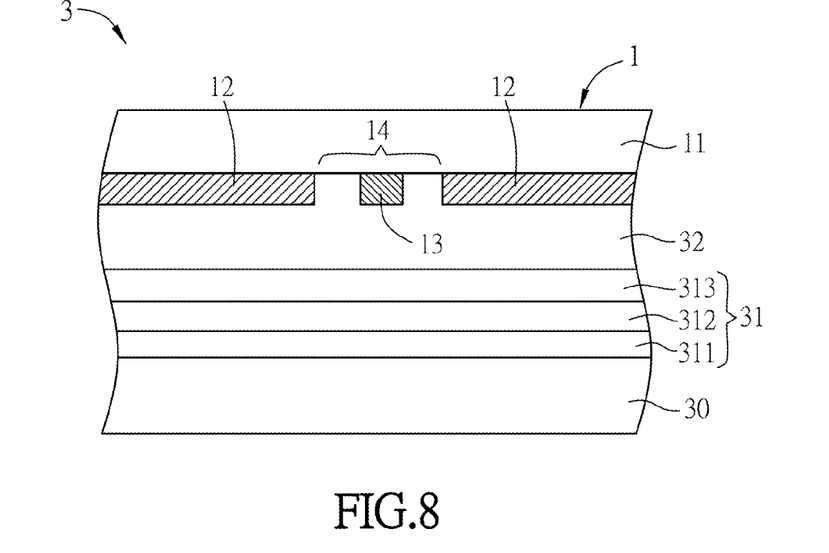
FIG. 8 is a schematic diagram of the anti-interference touch sensing structure applied to the organic electro-luminescence (OEL) touch display device of an embodiment of the invention.

FIG. 8 is a schematic diagram of the anti-interference touch sensing structure applied to the OEL touch display device of an embodiment of the invention, and herein the anti-interference touch sensing structure 1 is illustrated as an example. As shown in FIG. 8, the OEL touch display device 3 includes the anti-interference touch sensing structure 1, a second substrate 30 and a plurality of OEL units 31. The OEL units 31 are disposed on the second substrate 30, and the first substrate 11 and the second substrate 30 are attached to each other to seal the OEL units 31. The OEL units 31 can include a first electrode layer 311, an organic light emitting layer 312 and a second electrode layer 313. The first electrode layer 311 is disposed on the second substrate 30, and the organic light emitting layer 312 is disposed between the first electrode layer 311 and the second electrode layer 313. The structure of the above OEL unit 31 is just for the illustrative purpose but not for limiting the scope of the invention. In other embodiments, the OEL unit can further include a hole-transporting layer and an electron-transporting layer for example. Moreover, the OEL touch display device 3 can further include at least a functional layer 32, which is disposed between the first substrate 11 and the second substrate 30 and is an adhesive layer here for example. Of course, according to the requirement, the functional layer 32 can be adjusted in location and functionality, and it can be a passivation or a planarization layer for example.

Figure 9:
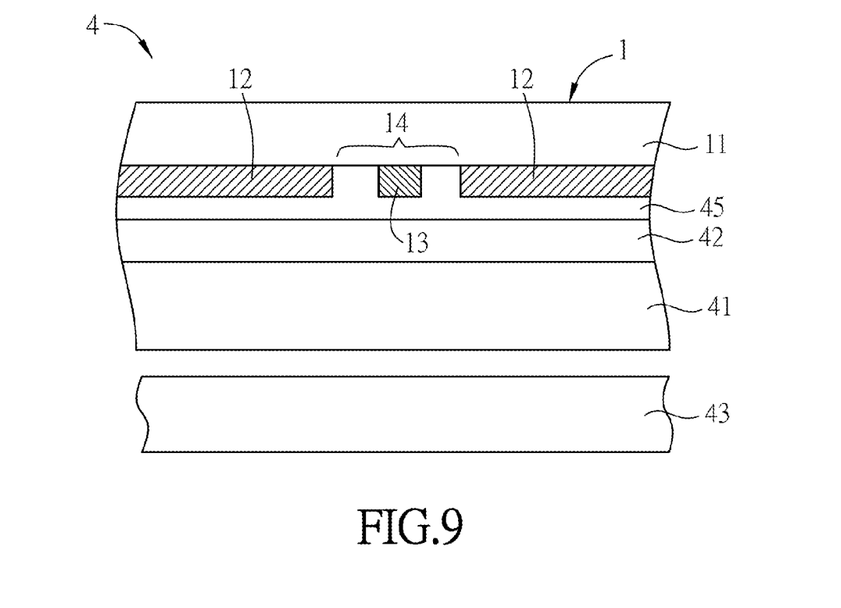
FIG. 9 is a schematic diagram of the anti-interference touch sensing structure applied to the liquid crystal touch display device of an embodiment of the invention.

FIG. 9 is a schematic diagram of the anti-interference touch sensing structure applied to the liquid crystal touch display device of an embodiment of the invention, and herein the anti-interference touch sensing structure 1 is illustrated as an example. As shown in FIG. 9, the liquid crystal touch display device 4 includes the anti-interference touch sensing structure 1, a third substrate 41, a liquid crystal layer 42 and a backlight module 43. The liquid crystal layer 42 is disposed between the first substrate 11 and the third substrate 41. The backlight module 43 is disposed adjacent to the third substrate 41. In this embodiment, the anti-interference touch sensing structure 1 is closer to the user than the third substrate 41, so as to enhance the touch sensing accuracy. Herein for example, the first substrate 11 can further include a color filter layer and a black matrix layer, and the third substrate 41 can further include a thin film transistor layer. Moreover, the liquid crystal touch display device 4 can further include at least a functional layer 45, which is disposed between the first substrate 11 and the third substrate 41 and is a planarization layer herein for example. Of course, according to the requirement, the functional layer 45 can be adjusted in location and functionality, and it can be a passivation or an adhesive layer for example. The liquid crystal touch display device 4 can include a vertical alignment (VA) display panel, an in-plane switching (IPS) display panel or a fringe field switching (FFS) display panel.

Summarily, in the anti-interference touch sensing structure of this invention, the first anti-interference spot is disposed in the first interval region formed by the adjacent touch sensing units, and thereby the interval between the touch sensing units is increased, for example, to 70 µm~130 µm from the original 10 µm~30 µm. Hence, even if the particles fall down or the scratch occurs during the process, the adjacent touch sensing units won't be short-circuited. Therefore, the first anti-interference spots provide the electrical anti-interference effect, so as to prevent the malfunction of the touch product and enhance the product yield. Furthermore, the touch sensing units may make the human eyes perceive the existence of the touch sensing units, but because the first anti-interference spot is disposed between the adjacent touch sensing units, the human eyes will not easily perceive their existence, so that the first anti-interference spot can further provide the optical anti-interference effect and the display performance can be maintained.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An anti-interference touch sensing structure, comprising:
   a first substrate;
   a plurality of touch sensing units coplanarly disposed on the first substrate, wherein a first interval region is formed between the adjacent touch sensing units; and
   at least one first anti-interference spot disposed within the first interval region,
   wherein a material of the at least one first anti-interference spot includes indium tin oxide (ITO).

2. The anti-interference touch sensing structure as recited in claim 1, wherein the at least one first anti-interference spot is electrically floating.

3. The anti-interference touch sensing structure as recited in claim 1, wherein the plurality of touch sensing units include a plurality of first touch sensing elements electrically connected with each other along a first direction and a plurality of second touch sensing elements electrically connected with each other along a second direction.

4. The anti-interference touch sensing structure as recited in claim 1, wherein a width of the at least one first anti-interference spot is between 50 µm and 70 µm, and a distance exists between the at least one first anti-interference spot and one of the plurality of touch sensing units adjacent to the at least one first anti-interference spot.

5. The anti-interference touch sensing structure as recited in claim 1, wherein the width of the first interval region is between 70 µm and 130 µm.

6. The anti-interference touch sensing structure as recited in claim 1, further comprising:
   a grounding unit disposed coplanarly with the plurality of touch sensing units, wherein the grounding unit and one of the plurality of touch sensing units adjacent to the grounding unit have a second interval region therebetween; and
   at least one second anti-interference spot disposed within the second interval region.

7. The anti-interference touch sensing structure as recited in claim 6, wherein the width of the at least one second anti-interference spot is between 50 µm and 70 µm.

8. The anti-interference touch sensing structure as recited in claim 6, wherein the width of the second interval region is between 70 µm and 130 µm.

9. The anti-interference touch sensing structure as recited in claim 6, wherein a shape of each of the plurality of touch sensing units, the at least one first anti-interference spot, the grounding unit and the at least one second anti-interference spot is a curved shape, a triangle, a quadrangle, a polygon or their any combination.

10. The anti-interference touch sensing structure as recited in claim 6, wherein a width of the two adjacent second anti-interference spots can be between 100 µm and 140 µm, and a width of the second interval region can be between 120 µm and 200 µm.

11. The anti-interference touch sensing structure as recited in claim 1, wherein by the at least one first anti-interference spot disposed within the first interval region formed by the adjacent touch sensing units, the interval between the adjacent touch sensing units is increased, the short circuit is prevented even if the particle pollution is caused during a subsequent process, so as to provide the electrical anti-interference effect.

12. The anti-interference touch sensing structure as recited in claim 11, wherein the subsequent process at least includes a mechanical thinning process, a chemical thinning process, a chemical-mechanical thinning process, a photo-lithography process, a thin film deposition process and/or a thin film etching process.

13. The anti-interference touch sensing structure as recited in claim 1, wherein the at least one first anti-interference spot is a massive spot or includes at least a bent spot.

14. The anti-interference touch sensing structure as recited in claim 1, wherein the first substrate is a cover glass.

15. The anti-interference touch sensing structure as recited in claim 1, wherein the adjacent touch sensing units are electrically insulated from each other.

16. The anti-interference touch sensing structure as recited in claim 1, wherein the at least one first anti-interference spot and the plurality of touch sensing units have the same transparent conducting material.

17. The anti-interference touch sensing structure as recited in claim 1, wherein the at least one first anti-interference spot exhibits a zigzag pattern.

18. The anti-interference touch sensing structure as recited in claim 1, wherein the anti-interference touch sensing structure is applied to a metal mesh, an out-cell touch display panel, an organic electro-luminescence (OEL) touch display device or a liquid crystal touch display device.

* * * * *